(12) United States Patent
Falossi et al.

(10) Patent No.: US 11,059,323 B2
(45) Date of Patent: Jul. 13, 2021

(54) SEALING DEVICE FOR A HUB/WHEEL ASSEMBLY AND HUB/WHEEL ASSEMBLY HAVING SUCH A SEALING DEVICE

(71) Applicant: Aktiebolaget SKF, Gothenburg (SE)

(72) Inventors: Marco Falossi, San Raffaele Cimena (IT); Maurizio Bertola, Turin (IT); Giorgio Missiaggia, Piscina (IT)

(*) Notice: Subject to any disclaimer, the term of this patent is extended or adjusted under 35 U.S.C. 154(b) by 345 days.

(21) Appl. No.: 16/113,228

(22) Filed: Aug. 27, 2018

(65) Prior Publication Data

US 2019/0070897 A1 Mar. 7, 2019

(30) Foreign Application Priority Data

Sep. 5, 2017 (IT) .......................... 102017000099283

(51) Int. Cl.
*B60B 27/00* (2006.01)
*F16C 33/72* (2006.01)
(Continued)

(52) U.S. Cl.
CPC ...... *B60B 27/0073* (2013.01); *B60B 27/0068* (2013.01); *B60B 27/02* (2013.01); *F16C 19/184* (2013.01); *F16C 33/586* (2013.01); *F16C 33/723* (2013.01); *F16C 33/78* (2013.01); *F16C 33/7843* (2013.01); *F16C 33/7886* (2013.01); *B60B 27/0005* (2013.01); *B60B 2310/204* (2013.01); *B60B 2320/10* (2013.01); *B60B 2360/3412* (2013.01); *B60B 2380/12* (2013.01); *B60B 2900/5112* (2013.01); *B60B 2900/5114* (2013.01); *F16C 19/186* (2013.01); *F16C 41/007* (2013.01); *F16C 2226/74* (2013.01); *F16C 2326/02* (2013.01); *F16C 2326/10* (2013.01)

(58) Field of Classification Search
CPC ............ B60B 27/0005; B60B 27/0068; B60B 27/0073; F16C 33/723; F16C 33/72; F16C 33/76
See application file for complete search history.

(56) References Cited

U.S. PATENT DOCUMENTS 5,172,984 A 12/1992 Lederman
5,195,807 A 3/1993 Lederman
(Continued)

FOREIGN PATENT DOCUMENTS

CN 103423322 A 12/2013
DE 112013000905 T5 11/2014
(Continued)

*Primary Examiner* — Jason R Bellinger
(74) *Attorney, Agent, or Firm* — Reed Smith LLP

(57) ABSTRACT

A sealing device for a hub/wheel assembly with a roller bearing. The sealing device includes a guard, made of plastic. The guard is coupled to an outer ring of the bearing to seal off the bearing. The guard has a cylindrical mounting wall with an outer lateral surface coupled to an inner lateral surface of a collar of the outer ring, and a snap-engagement step for engaging with the collar made along the outer lateral surface so that it snap-fits in a contoured annular groove made along the collar about the axis. An annular gasket is made of elastomer and co-injection-molded inside an annular groove made in the cylindrical mounting wall on the same side as the snap-engagement step.

12 Claims, 2 Drawing Sheets

(51) Int. Cl.
 *F16C 33/78* (2006.01)
 *F16C 33/58* (2006.01)
 *B60B 27/02* (2006.01)
 *F16C 19/18* (2006.01)
 *F16C 41/00* (2006.01)

(56) References Cited

U.S. PATENT DOCUMENTS

| | | | |
|---|---|---|---|
| 6,170,919 B1 * | 1/2001 | Hofmann | B60B 27/0005 |
| | | | 301/105.1 |
| 6,581,939 B1 | 6/2003 | Theros et al. | |
| 6,862,808 B2 * | 3/2005 | Miyazaki | B60B 27/0084 |
| | | | 29/509 |
| 8,043,009 B2 * | 10/2011 | Shige | B60B 27/0026 |
| | | | 384/448 |
| 8,393,795 B2 * | 3/2013 | Aritake | B60B 27/0005 |
| | | | 384/489 |
| 8,657,503 B2 * | 2/2014 | Serafini | F16C 33/723 |
| | | | 384/544 |
| 8,690,449 B2 * | 4/2014 | Seki | B60B 27/0068 |
| | | | 384/544 |
| 9,016,949 B2 * | 4/2015 | Baratti | B60B 27/0068 |
| | | | 384/448 |
| 9,328,770 B2 | 5/2016 | Ishida | |
| 10,093,126 B2 * | 10/2018 | Weigand | B60B 27/0073 |
| 2011/0181101 A1 * | 7/2011 | Sicilia | F16C 33/783 |
| | | | 301/108.1 |

FOREIGN PATENT DOCUMENTS

| | | |
|---|---|---|
| EP | 1602844 A1 | 12/2005 |
| EP | 1820985 A1 | 8/2007 |
| EP | 2339194 A1 | 6/2011 |
| EP | 2596962 A1 | 5/2013 |
| JP | H0988945 A | 3/1997 |
| JP | 2007321795 A | 12/2007 |
| JP | 2009216208 A | 9/2009 |
| JP | 2012036960 A | 2/2012 |
| JP | 2012087858 A | 5/2012 |
| JP | 2014190464 A | 10/2014 |
| WO | 2009119036 A1 | 10/2009 |
| WO | WO-2015158547 A1 * | 10/2015 ........... B60B 7/0013 |

* cited by examiner

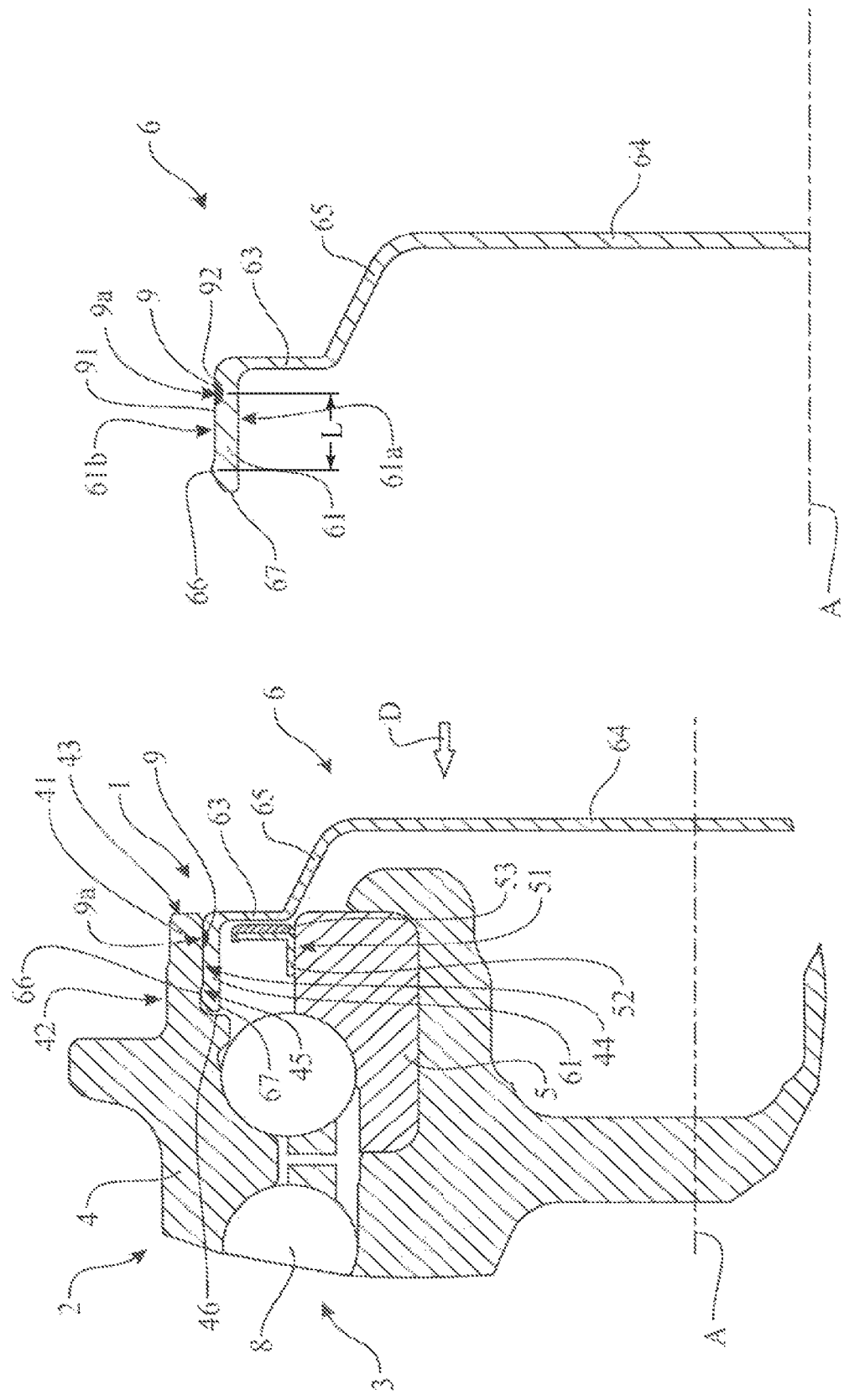

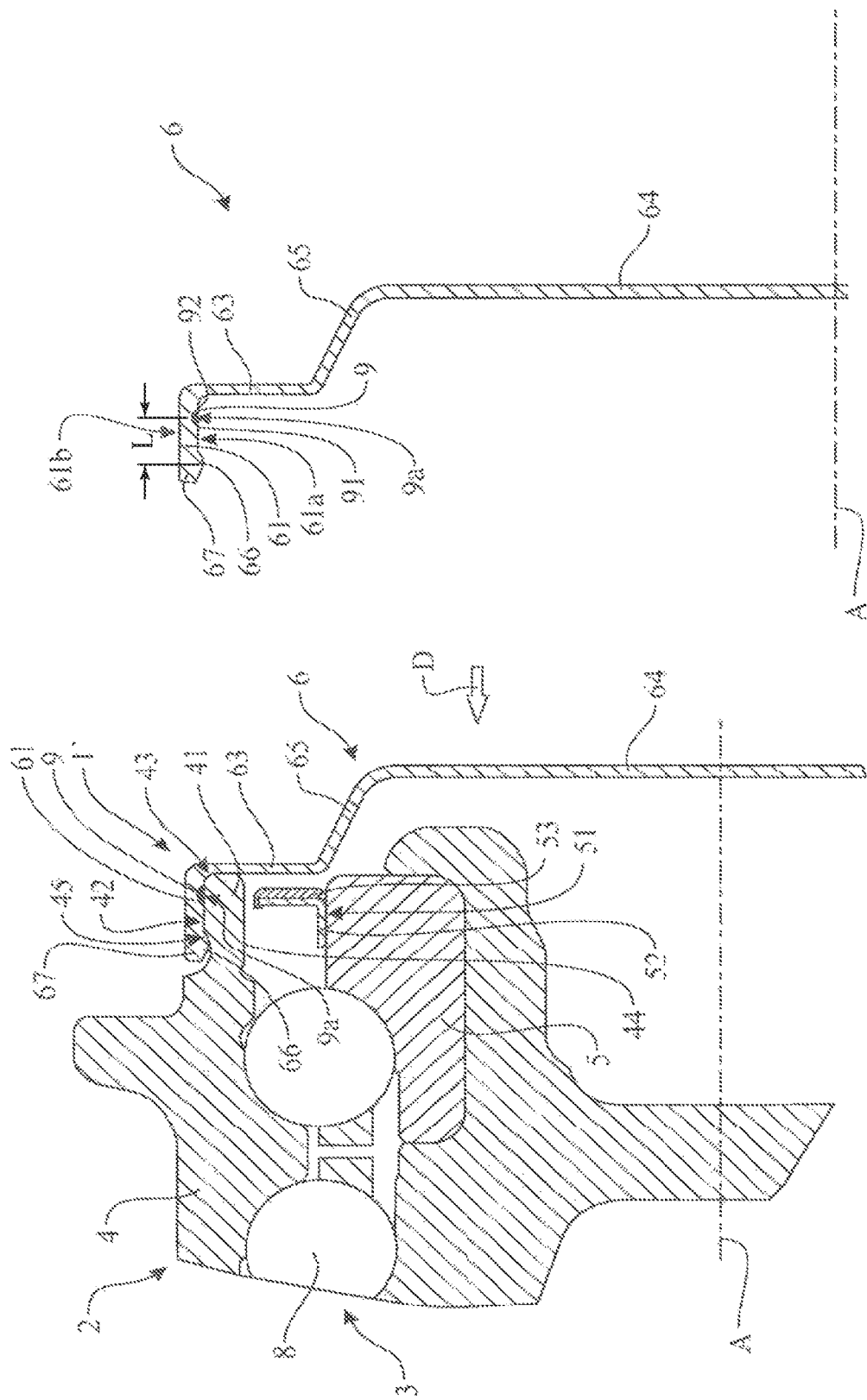

SEALING DEVICE FOR A HUB/WHEEL ASSEMBLY AND HUB/WHEEL ASSEMBLY HAVING SUCH A SEALING DEVICE

CROSS-REFERENCE

This application claims priority to Italian patent application no. 102017000099283 filed on Sep. 5, 2017, the contents of which are fully incorporated herein by reference.

TECHNOLOGICAL FIELD

The present invention relates to a sealing device for a hub/wheel assembly. The invention also relates to a bearing/hub assembly having such a sealing device.

The present invention is particularly, although not exclusively, applicable to the field of hub/wheel assemblies for motor vehicles having a roller bearing for a non-driving wheel. In such applications, the inner ring of the bearing is rigidly secured to the shaft of the wheel and transmits to the latter the consequent rotary movement, while the outer ring of the bearing is rigidly secured to a fixed hub, for example a hub of a motor vehicle suspension. The text below will refer, by way of example, to this specific use, although it remains generally applicable.

BACKGROUND

Since the invention applies in this case to non-driving wheels which thus do not have a through-shaft along the axis of the bearing, the relevant sealing devices have an axisymmetric "cup" shape such that they laterally close off the outer ring of the bearing and create a static seal to protect the bearing from any ambient contamination (water, dust, dirt, etc.).

In their most generic form, the sealing devices comprise a plastic guard, almost cup-shaped, which is mounted on a collar of the outer ring of the roller bearing by press-fitting with interference and they include, in particular:

a cylindrical mounting wall, coaxial with an axis of symmetry of the bearing, which is coupled by means of the press-fitting with the collar of the outer ring of the bearing;

an annular reading wall, transverse to the axis of symmetry and interposed between a detection sensor mounted on the outside of the bearing and a phonic wheel mounted on the inside of the bearing, and a discoidal end wall internal to the annular reading wall and facing, transversely to the axis of symmetry, an inner ring of the bearing.

Although in earlier embodiments, sealing devices were designed to perform their function only by means of coupling by interference with the bearing, in some current embodiments, such as that described for example in JP2009216208A, the sealing devices have an annular locking step, which is rigidly secured to the cylindrical wall and may be snap-fitted in the collar of the outer ring of the bearing to axially secure the guard to the outer ring, and they are also provided with an adhesive material distributed around the cylindrical wall to subsequently seal the guard against the collar of the outer ring of the bearing.

However, the use of this adhesive material is not particularly good from the environmental viewpoint, and moreover requires considerable precautions during the assembly of the sealing devices, to the detriment of production times.

BRIEF SUMMARY OF THE PRESENT INVENTION

It is an aim of the present invention to produce a sealing device for a hub/wheel assembly which does not have the abovementioned disadvantages.

A sealing device for a hub/wheel assembly with a roller bearing, which has the features of the present invention defined as follows:

A sealing device for a hub/wheel assembly with a roller bearing, the sealing device having a central axis, the sealing device comprising:

a guard coupled to an outer ring of the bearing so as to seal off the bearing, the guard having a cylindrical mounting wall including a first lateral surface coupled to a second lateral surface of a collar of the outer ring;

a snap-engagement for engaging the guard with the collar made along the first lateral surface so that it snap-fits in a contoured annular groove made along the collar about the axis; and an annular sealing arrangement made of an elastomer and arranged inside an annular groove made in the cylindrical mounting wall on the same side as the snap-engagement, the guard being made of plastic and the annular sealing arrangement being co-injection-molded inside the groove and adhering chemically to the plastic of the guard.

Further embodiments of the invention, which are preferred and/or particularly advantageous, are described according to the features set forth as follows:

In another aspect, the annular groove is made in the cylindrical mounting wall at an axial distance determined with respect to the snap-engagement means to allow radial deformation of the cylindrical mounting wall with respect to the collar so as to move the annular sealing arrangement away from the collar until the snap-engagement means are snap-fitted in the contoured annular groove.

In yet another aspect, the snap-engagement and the annular sealing arrangement inside the groove are arranged on a first outer lateral surface of the cylindrical mounting wall and the contoured annular groove is made along the collar about the axis on a second inner lateral surface of the collar.

In yet another aspect, the contoured annular groove has an axial stop element that, when applicable, comes into contact with an end of the cylindrical mounting wall.

In yet another aspect, the snap-engagement and the annular sealing arrangement inside the groove are arranged on a first inner lateral surface of the cylindrical mounting wall and the contoured annular groove is made along the collar about the axis on a second outer lateral surface of the collar.

In yet another aspect, the snap-engagement is defined by a step which is circumferentially continuous, in the form of an annular ridge, or, preferably, by a step which is circumferentially discrete, in the form of bumps which are angularly separated from one another, and this step can interact by snap-fitting with the contoured annular groove to axially engage the guard with the collar.

In yet another aspect, the snap-engagement is defined by a step which is circumferentially continuous, in the form of a step which is circumferentially discrete, in the form of bumps, which are angularly separated from one another, and this step can interact by snap-fitting with the contoured annular groove to axially engage the guard with the collar.

In yet another aspect, the sealing device can be integrated into a roller bearing that is installed on a hub/wheel assembly.

BRIEF DESCRIPTION OF THE DRAWINGS

The invention will now be described with reference to the attached drawings, which show some non-limiting embodiments of the invention, in which:

FIG. 1 presents a view, with parts in section and parts removed for clarity, of a first preferred embodiment of a sealing device for a hub/wheel assembly according to the present invention;

FIG. 2 presents a section view, on an enlarged scale, of the sealing device of FIG. 1;

FIG. 3 presents a view, with parts in section and parts removed for clarity, of a second preferred embodiment of a sealing device for a hub/wheel assembly according to the present invention;

FIG. 4 presents a view in section, on an enlarged scale, of the sealing device of FIG. 3.

DETAILED DESCRIPTION OF THE PRESENT INVENTION

With reference to FIG. 1, a sealing device for a hub/wheel assembly 2 is shown with the general reference sign 1.

The assembly 2 has a roller bearing 3 comprising an outer ring 4, coaxial with an axis A of rotation of the bearing 3, an inner ring 5 coaxial with the outer ring 4, and a plurality of roller elements 8, for example balls, interposed between the outer ring 4 and the inner ring 5 to allow the inner ring 5 to rotate, in rotational use, with respect to the outer ring 4, in fixed use. The outer ring 4 of the bearing 3 has a collar 41, which is defined by a cylindrical outer lateral surface 42, an annular end surface 43, and a cylindrical inner lateral surface 44. As for the inner ring 5, it has a phonic wheel 51, which is rigidly secured to the inner ring 5 and has a mounting support 52 defined, preferably, by a plate bent in the shape of an L, and a ring 53 of ferromagnetic material fastened to the support 52.

The sealing device 1, according to the present invention, has the axis A as central axis and comprises a guard 6, which is coupled to the outer ring 4 of the bearing 3, has substantially a cup shape, and is made of plastic, preferably PA66 or PPA reinforced with glass fibers to provide the necessary mechanical strength and dimensional stability.

As shown also in FIG. 2, the guard 6 comprises:
- a cylindrical mounting wall 61, coaxial with the axis A, which is coupled to the collar 41 of the outer ring 4 of the bearing 3, and has an inner lateral surface 61a and an outer lateral surface 61b;
- an annular reading wall 63, transverse to the axis A of symmetry, connected to the cylindrical wall 61 and interposed between a detection sensor (not shown) mounted on the outside of the bearing 3 and the phonic wheel 51 mounted on the inside of the bearing 3; and
- a discoidal end wall 64 which is internal, in a radial direction, to the annular reading wall 63 and which faces, transversely to the axis A, the inner ring 5 of the bearing 3.

The guard 6 further comprises a frustoconical wall 65 for connecting the annular wall 63 to the end wall 64, the conicity of which tapers on the side away from the bearing 3, and a saw-tooth step 66 made along the cylindrical mounting wall 61 substantially at a free end 67 of the cylindrical mounting wall 61 axially on the side away from the annular reading wall 63. In the preferred embodiment, the step 66 is circumferentially continuous, in the form of an annular ridge, and can interact by snap-fitting with a recess 45, or contoured annular groove, made along the collar 41 about the axis A.

Alternatively, the step 66 may also be made circumferentially discrete, for example as a plurality of bumps angularly separated from one another by circumferential openings, or circumferential windows.

In the preferred embodiment of the sealing device 1 of the present invention shown in FIGS. 1 and 2, the step 66 is made on the outer lateral surface 61b of the cylindrical mounting wall 61 and extends radially outwards from the outer lateral surface 61b while, accordingly, the recess 45 is made in the cylindrical inner lateral surface 44 of the collar 41. As the guard 6 is being press-fitted in the collar 41, in a press-fitting direction D, the step 66 slides along and in contact with the inner lateral surface 44, until it reaches the recess 45, and is then snap-fitted into the recess 45, axially engaging, at least in the direction of removal, the guard 6 inside the collar 41. To prevent the guard 6 from being axially press-fitted too far into the collar 41, even after snap-fitting of the step 66 in the recess 45, the latter has an axial stop end wall 46 against which, where applicable, the end 67 of the cylindrical mounting wall 61 may come into contact, thereby preventing any contact between the annular reading wall 63 and the phonic wheel 51. In any case, to prevent any kind of potential contact between the annular reading wall 63 and the phonic wheel 51, the axial distance between the end 67 of the cylindrical mounting wall 61 and the axial stop end wall 46 is smaller than the axial distance between the annular reading wall 63 and the phonic wheel 51.

The step 66 slides along the inner lateral surface 44 substantially freely, if only due to the need to overcome the friction generated by the contact between the step 66 and the inner lateral surface 44 and, in the alternative case in which the step 66 is made as circumferentially discrete, the friction may be reduced in combination, possibly, with the guard 6 being made of more rigid plastic.

Alternatively, in the preferred embodiment of the present invention of the sealing device 1 which is an alternative to that just described, indicated by the reference sign 1' in FIGS. 3 and 4, the step 66 is made on the inner lateral surface 61a of the cylindrical mounting wall 61 and extends radially inwards from the inner lateral surface 61a while, accordingly, the recess 45 is made in the cylindrical outer lateral surface 42 of the collar 41. As the guard 6 is being press-fitted in the collar 41, the step 66 slides along and in contact with the outer lateral surface 42, until it reaches the recess 45, and is then snap-fitted into the recess 45, axially engaging the guard 6 inside the collar 41. In this alternative preferred embodiment of the invention, the guard 6 may never be press-fitted too far into the outside of the collar 41, even after snap-fitting of the step 66 in the recess 45, since the snap-fitting occurs substantially concomitantly with the axial contact between the annular reading wall 63 and the annular end surface 43 of the collar 41.

In this case too, the step 66 slides along the outer lateral surface 42 substantially freely, if only due to the need to overcome the friction generated by the contact between the step 66 and the lateral surface 44 and, in the alternative case in which the step 66 is made as circumferentially discrete, the friction may be reduced in combination, possibly, with the guard 6 being made of more rigid plastic.

Lastly, to ensure the guard 6 is leak-tight once mounted on the collar 41, or to ensure the bearing 3 is sealed off from the outside and prevent external contaminants (water, dirt, dust, etc.) from entering the bearing 3, the sealing device 1 shown in FIGS. 1 and 2 further comprises an annular gasket 9 arranged inside a respective annular groove 9a, which is made in the cylindrical mounting wall 61 on the same side as the step 66 at an axial distance L from the step 66 and has, in section, a substantially trapezoidal shape axially defined by two opposite axial annular edges 91 and 92. The gasket 9 is made of a thermoplastic elastomer such as TPE, TPS, TPV or the like, and is co-injection-molded inside the groove 9a, adhering chemically to the plastic of the guard 6, thus making it possible to hold the annular elastomer gasket 9 in place during press-fitting of the guard 6.

In the preferred embodiment of the sealing device 1 shown in FIGS. 1 and 2, the annular groove 9a, in which the elastomer of the annular gasket 9 is co-injection-molded, is made in the outer lateral surface 61b of the cylindrical mounting wall 61, and the annular gasket 9 is arranged inside the groove 9a, projecting slightly with respect to the outer lateral surface 61b while, according to an embodiment not shown, the annular gasket 9 is arranged inside the groove 9a substantially flush with the lateral surface 61b at least at the two axial annular edges 91 and 92, and has a substantially domed shape at the centre of the groove 9a, projecting radially outwards from the outer lateral surface 61b. When the guard 6 is press-fitted into the collar 41, the step 66, sliding along the inner lateral surface 44, causes a radial inward flexion of the cylindrical mounting wall 61, preventing rubbing of the gasket 9 from just before the inner lateral surface 44 substantially until the step 66 is snap-fitted inside the recess 45 and thus preserving, thanks to the position of the gasket 9 at the distance L from the step 66, the sealing characteristics of the gasket 9.

The distance L is determined as a function of the plastic from which the guard 6 is made, or the rigidity and/or flexibility thereof, or as a function of the radial height of the step 66, which must be such as to allow elastic deformation of the wall 61 or, also, as a function of the axial dimensions and, above all, radial dimensions of the gasket 9: indeed, as stated above, the annular gasket 9 is arranged inside the groove 9a such that it projects slightly with respect to the outer lateral surface 61b but not beyond the step 66 and, therefore, during press-fitting, due to the outer lateral surface 61b being moved elastically away from the cylindrical inner lateral surface 44, it is not caught in any way, allowing it to slide freely between the two lateral surfaces 61b and 44. This effect is beneficial also in the case (not shown) in which only the more central part of the gasket 9 projects with respect to the lateral surface 61b by virtue of its being substantially domed radially outwards at the centre of the groove 9a.

Once the step 66 is snap-fitted inside the recess 45, the cylindrical mounting wall 61 returns to its undeformed configuration, radially compressing the gasket 9 between the cylindrical mounting wall 61 and the collar 41, thereby ensuring the necessary leak-tight seal of the sealing device 1.

Alternatively, in the preferred embodiment of the present invention of the sealing device 1 which is an alternative to that just described, indicated by the reference sign 1' in FIGS. 3 and 4, the annular groove 9a, in which the elastomer of the gasket 9 is co-injection-molded, is made in the inner lateral surface 61a of the cylindrical mounting wall 61, and the annular gasket 9 is arranged inside the groove 9a, projecting slightly with respect to the inner lateral surface 61a while, according to an embodiment not shown, the annular gasket 9 is arranged inside the groove 9a substantially flush with the lateral surface 61a at least at the two axial annular edges 91 and 92, and has a substantially domed shape at the centre of the groove 9a, projecting radially outwards from the inner lateral surface 61a. When the guard 6 is press-fitted into the collar 41, the step 66, sliding along the outer lateral surface 42, causes a radial outward flexion of the cylindrical mounting wall 61, preventing rubbing of the gasket 9 from just before the outer lateral surface 42 substantially until the step 66 is snap-fitted inside the recess 45 and thus preserving, thanks to the position of the gasket 9 at the distance L from the step 66, the sealing characteristics of the gasket 9.

Also in this alternative embodiment, the distance L is determined as a function of the plastic from which the guard 6 is made, or the rigidity and/or flexibility thereof, or as a function of the radial height of the step 66, which must be such as to allow elastic deformation of the wall 61 or, also, as a function of the axial and radial dimensions of the gasket 9: indeed, as stated above, the annular gasket 9 is arranged inside the groove 9a such that it projects slightly with respect to the outer lateral surface 61b but not beyond the step 66 and, therefore, during press-fitting, due to the inner lateral surface 61a being moved elastically away from the cylindrical outer lateral surface 42, it is not caught in any way, allowing it to slide freely between the two lateral surfaces 61a and 42. This effect is beneficial also in the case (not shown) in which only the more central part of the gasket 9 projects with respect to the lateral surface 61a by virtue of its being substantially domed radially inwards at the centre of the groove 9a.

Also in this case, once the step 66 is snap-fitted inside the recess 45, the cylindrical mounting wall 61 returns to its undeformed configuration, radially compressing the gasket 9 between the cylindrical mounting wall 61 and the collar 41, thereby ensuring the necessary leak-tight seal of the sealing device 1.

The sealing device 1 and 1' described above, in the preferred embodiments thereof, has undeniable advantages when it comes to the production of the guard 6, which may be made completely in a single molding operation, and when it comes to assembly with the bearing 3 since the guard 6 may be presented to, and mounted on, the bearing 3 without the need for any other operation. Above all, the fact that a groove 9a is made in the cylindrical mounting wall 61, and the material for the gasket 9 is injected therein, helps keep control of all the geometric dimensions of the sealing device 1 much to the advantage of performance in terms of sealing and stability. Moreover, in combination, the fact that the groove 9a and the related gasket 9 are on the same side as the step 66 makes it possible to avoid any damage to the gasket 9 when the guard 6 is mounted on the bearing 3.

According to the invention, by virtue of the sealing device 1, or the sealing device 1', a hub/wheel assembly 2 like that described above is obtained in which the guard 6 comprises:
  a cylindrical mounting wall 61, coaxial with the axis A, which is coupled to the collar 41 of the outer ring 4 of the bearing 3, and has an inner lateral surface 61a and an outer lateral surface 61b;
  a saw-tooth step 66 made along the cylindrical mounting wall 61, and
  an annular gasket 9, which is arranged inside a respective annular groove 9a made in the wall 61 on the same side as the step 66 at an axial distance L from the step 66.

In the above hub/wheel assembly 2, in the guard 6, preferably in combination with the abovementioned features, the saw-tooth step 66 and the annular gasket 9 may be arranged radially on the outside of the cylindrical mounting wall 61 so as to interact, respectively, with a recess 45 made on the inside of the collar 41 and a cylindrical inner lateral surface 44 of the collar 41 or, alternatively, the saw-tooth step 66 and the annular gasket 9 may be arranged radially on the inside of the cylindrical mounting wall 61 so as to interact, respectively, with a recess 45 made on the outside of the collar 41 and a cylindrical outer lateral surface 42 of the collar 41.

In addition to the embodiments of the invention as described above, it is to be understood that there are numerous other variants. It is also to be understood that the embodiments are solely exemplary and do not limit the scope of the invention, its applications, or its possible configurations. On the contrary, although the above description enables those skilled in the art to apply the present invention in at least one exemplary configuration, it is to be understood that numerous variations of the described components may be devised, without thereby departing from the scope of the invention as defined in the appended claims, interpreted literally and/or according to their legal equivalents.

What is claimed is:

1. A sealing device for a hub/wheel assembly with a roller bearing, the sealing device having a central axis, the sealing device comprising:
    a guard coupled to an outer ring of the bearing so as to seal off the bearing, the guard having a cylindrical mounting wall including a first lateral surface coupled to a second lateral surface of a collar of the outer ring;
    a snap-engagement for engaging the guard with the collar made along the first lateral surface so that the snap-engagement snap-fits in a contoured groove made along the collar about the axis; and
    an annular sealing arrangement made of an elastomer and arranged inside an annular groove made in the cylindrical mounting wall on the same side as the snap-engagement, the guard being made of plastic and the annular sealing arrangement being co-injection-molded inside the groove and adhering chemically to the plastic of the guard;
    wherein the annular groove is made in the cylindrical mounting wall at an axial distance determined with respect to the snap engagement to allow radial deformation of the cylindrical mounting wall with respect to the collar so as to move the annular sealing arrangement away from the collar until the snap-engagement is snap-fitted in the contoured groove.

2. The sealing device according to claim 1, wherein the snap-engagement and the annular sealing arrangement inside the groove are arranged on a first outer lateral surface of the cylindrical mounting wall and the contoured groove is made along the collar about the axis on a second inner lateral surface of the collar.

3. The sealing device according to claim 2, wherein the contoured groove has an axial stop element that, when applicable, comes into contact with an end of the cylindrical mounting wall.

4. The sealing device according to claim 1, wherein the snap-engagement and the annular sealing arrangement inside the groove are arranged on a first inner lateral surface of the cylindrical mounting wall and the contoured groove is made along the collar about the axis on a second outer lateral surface of the collar.

5. The sealing device according to claim 1, wherein the snap-engagement is defined by a step which is circumferentially discrete, in the form of bumps which are angularly separated from one another, and this step can interact by snap-fitting with the contoured groove to axially engage the guard with the collar.

6. The sealing device according claim 1, wherein the snap-engagement is defined by a step which is circumferentially continuous, in the form of an annular ridge, and this step can interact by snap-fitting with the contoured groove to axially engage the guard with the collar.

7. A hub/wheel assembly comprising:
    an outer ring, in stationary use; an inner ring, in rotational use;
    at least east one row of rotating bodies interposed between the outer ring and the inner ring; and
    a sealing device with a central axis, wherein the sealing device comprises:
        a guard, which is coupled to an outer ring of the bearing so as to seal off the bearing, and which has a cylindrical mounting wall having a first lateral surface coupled to a second lateral surface of a collar of the outer ring; and
        a snap-engagement for engaging the guard with the collar made along the first lateral surface so that the snap-engagement snap-fits in a contoured groove made along the collar about the axis;
    wherein the sealing device further comprises an annular sealing arrangement made of elastomer and arranged inside an annular groove made in the cylindrical mounting wall on the same side as the snap-engagement;
    the guard being made of plastic and the sealing arrangement being co-injection-molded inside the annular groove and adhering chemically to the plastic of the guard;
    wherein the annular groove is made in the cylindrical mounting wall at an axial distance determined with respect to the snap engagement to allow radial deformation of the cylindrical mounting wall with respect to the collar so as to move the annular sealing arrangement away from the collar until the snap-engagement is snap-fitted in the contoured groove.

8. The sealing device according to claim 7, wherein the snap-engagement and the annular sealing arrangement inside the groove are arranged on a first outer lateral surface of the cylindrical mounting wall and the contoured groove is made along the collar about the axis on a second inner lateral surface of the collar.

9. The sealing device according to claim 8, wherein the contoured groove has an axial stop element that, when applicable, comes into contact with an end of the cylindrical mounting wall.

10. The sealing device according claim 7, wherein the snap-engagement is defined by a step which is circumferentially discrete, in the form of bumps which are angularly separated from one another, and this step can interact by snap-fitting with the contoured groove to axially engage the guard with the collar.

11. The sealing device according to claim 7, wherein the snap-engagement is defined by a step which is circumferentially continuous, in the form of an annular ridge, and this step can interact by snap-fitting with the contoured groove to axially engage the guard with the collar.

12. A sealing device for a hub/wheel assembly with a roller bearing, the sealing device having a central axis, the sealing device comprising:
    a guard coupled to an outer ring of the bearing so as to seal off the bearing, the guard having a cylindrical mounting wall including a first lateral surface coupled to a second lateral surface of a collar of the outer ring;
    a snap-engagement for engaging the guard with the collar made along the first lateral surface so that the snap-engagement snap-fits in a contoured groove made along the collar about the axis; and an annular sealing arrangement made of an elastomer and arranged inside an annular groove made in the cylindrical mounting wall on the same side as the snap-engagement, the guard being made of plastic and the annular sealing arrangement being co-injection-molded inside the annular groove and adhering chemically to the plastic of the guard;

wherein the snap-engagement and the annular sealing arrangement inside the annular groove are arranged on the first outer lateral surface of the cylindrical mounting wall and the contoured groove is made along the collar about the axis on the second inner lateral surface of the collar.

* * * * *